Patented Dec. 25, 1951

2,580,053

UNITED STATES PATENT OFFICE 2,580,053

MINERAL OIL CONTAINING COPOLYMERS OF ALPHA-BETA UNSATURATED DICARBOXY ESTERS WITH ALPHA-BETA UNSATURATED MONOCARBOXY ACIDS

Thomas Stanford Tutwiler, Elizabeth, John C. Munday, Cranford, and Dilworth T. Rogers, Summit, N. J., assignors to Standard Oil Development Company, a corporation of Delaware No Drawing. Application August 30, 1949, Serial No. 113,254

5 Claims. (Cl. 252—56)

This invention relates to novel copolymers useful as lubricating oil additives. More particularly, it relates to copolymers of alpha-beta unsaturated dicarboxy esters, with alpha-beta unsaturated monocarboxy esters. The invention is particularly directed toward lubricating oils which contain these novel products.

It is well known in the art, that mineral base lubricating oils have serious limitations with respect to viscosity temperature relationships and pour point unless they are carefully prepared from selected materials or are modified by the addition of a material to enhance these characteristics. The additive materials which are incorporated into a lubricating oil to improve their viscosity temperature relationships often have a serious limitation in that they are susceptible to breakdown when they are used for long periods of time under conditions of great shear. Accordingly, it is the object of this invention to prepare an improved additive material which is suitable for improving the viscosity temperature relationship of a lubricating oil base and, in addition, which is stable at high rates of shear.

A further object of the invention is to produce a polymeric material which is useful for improving the viscosity temperature characteristics of oils without excessively increasing the viscosity thereof and which may be used in various oil base stocks, either synthetically derived or obtained from various crude oils such as paraffinic, naphthenic, asphaltic or mixed base crude oils.

A further object of the invention is to produce a superior pour point depressant.

In attempting to copolymerize alpha-beta unsaturated monocarboxy esters, such as acrylates and methacrylates, with alpha-beta unsaturated dicarboxy esters, such as fumarates and maleates, considerable trouble is usually encountered. In some cases, one of the monomer pairs polymerizes alone, and little or no copolymer is formed. In other cases copolymerization occurs but the monomers enter the copolymer in a different mol ratio from that in the monomer feedstock. As a result, the ratio of unreacted monomers continuously changes during the reaction, and the ratio of monomers entering the copolymers continuously changes. The final copolymer product is therefore a heterogeneous mixture of copolymer molecules of various mol ratios and of various molecular weights characterized by poor shear stability, relatively poor potency as regards viscosity index improving characteristics, and in some cases by incomplete oil solubility.

It has now been discovered, and is the primary object of this invention, that alpha-beta unsaturated monocarboxy acid esters may be copolymerized readily with alpha-beta unsaturated dicarboxy acid esters by choosing monomer pairs approaching one another in degree of copolymerization activity. When the correct degree of copolymerization activity of the monomer pairs is chosen, there results a clear homogeneous copolymer of good stability and good V. I. potency.

The copolymers of this invention are valuable not only for improving the viscosity index, depressing the pour point, etc. of lubricating oils, but also for compounding with low viscosity mineral oils to produce excellent hydraulic power transmission oils.

Throughout this application the word "monomer" may refer to a single ester or to a mixture of esters of the same type, but it does not refer to a mixture of different type esters. For example, "monomer" may refer to decyl acrylate per se or to a mixture of alpha-beta unsaturated monocarboxy acid esters. It may refer to diethyl maleate per se or to a mixture of alpha-beta unsaturated dicarboxy acid esters, but it does not refer to a mixture of alpha-beta unsaturated monocarboxy acid esters with alpha-beta unsaturated dicarboxy acid esters.

As was mentioned above, the invention is based on the discovery that when monomer pairs are chosen with the desired degree of copolymerization activity, an oil-soluble homogeneous copolymer results. The degree of copolymerization activity of an unsaturated monomer is determined to a considerable extent by the type of monomer and by the average molecular weight of the monomer. In general, alpha-beta unsaturated monocarboxy acid esters have a much higher degree of copolymerization activity than alpha-beta unsaturated dicarboxy acid esters when their molecular weights are in the same range. When one attempts to copolymerize these materials of approximately the same molecular weight, the alpha-beta unsaturated monocarboxy acid esters tend to polymerize with themselves and heterogeneous products result. It has now been discovered that if high molecular weight alpha-beta unsaturated monocarboxy acid esters, such as decyl acrylate, are copolymerized with low molecular weight alpha-beta unsaturated dicarboxy acid esters, such as diethyl maleate, wherein the difference in the alcohol contributed portion of the ester results in the two monomers being more nearly alike as to copolymerization activity, a high molecular weight homogeneous oil-soluble copolymer is obtained. In other words, by employing alpha-beta unsaturated monocarboxy acid esters of relatively high molecular weight alcohols, and/or alpha-beta unsaturated dicarboxy acid esters of relatively low molecular weight alcohols, the copolymerization activities of the two types of monomers approach one another.

The difference in molecular weight between the high molecular weight alpha-beta unsaturated monocarboxy acid ester and the low molecular weight alpha-beta unsaturated dicarboxy acid ester necessary to give a homogeneous copolymer will be determined to some extent by structure and by the presence or absence of substituent groups. For example fumaric acid esters are more reactive than maleic and glutaconic esters, and acrylic esters are more reactive than the corresponding methacrylic esters.

In the copolymerization of high molecular weight alpha-beta unsaturated monocarboxy acid esters with low molecular weight alpha-beta unsaturated dicarboxy acid esters, the difference in number of carbon atoms in the side chains, i. e., that portion of the ester contributed by the alcohol group, that is necessary to give a homogeneous copolymer should be at least 5 carbon atoms, with the monocarboxy acid ester containing the greater number of carbon atoms. For example, octyl or decyl methacrylate will copolymerize with diethyl maleate and/or dethyl fumarate to give homogeneous oil-soluble copolymers of high molecular weight. Increasing this difference in side chains to more than about 20 carbon atoms will result in unsatisfactory copolymers, first, because the copolymerization activity of the monomer pairs are again too dissimilar to produce homogeneous products, and second, because the V. I. potency is impaired. Also, increasing the average side chains of the unsaturated dibasic acid ester component of the copolymerization system to greater than 8 carbon atoms, even if the difference in the side chains are maintained to one within from 5 to 20 carbon atoms, will result in the production of products having decreased V. I. potency. To summarize briefly, in order to produce the copolymers of this invention, it is essential that:

(1) The alpha-beta unsaturated discarboxy acid ester be formed from an alcohol having less than 8 carbon atoms; and (2) The difference in the side chains of the two monomers must be between 5 and 20 carbon atoms.

This alpha-beta unsaturated monocarboxy acid esters useful in this invention have the following formula:

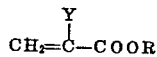

wherein Y is hydrogen or methyl and R is alkyl. Among the compounds of this type are the esters of acrylic acid and methacrylic acid. It is to be understood, of course, that mixtures of acrylate and methacrylate esters may be employed. In the preferred embodiment of the invention, the esters of methacrylic acid are used.

The alpha-beta unsaturated dicarboxy acid esters which are used in forming the copolymers of this invention have the following formula:

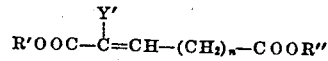

wherein Y' is hydrogen or methyl, $n$ is zero or 1, and R' and R'' are alkyl groups.

Included in compounds of this type are the esters of maleic acid, fumaric acid, glutaconic acid, alpha methyl glutaconic acid, mesaconic acid, citraconic acid and the like, maleic acid and fumaric acid esters being preferred. Mixtures of esters of different acids of this type may also be employed. While it is generally preferable to employ essentially neutral esters in the copolymerization reaction, half esters of the dibasic acids may be employed. The resulting copolymers containing free carboxyl groups may be used as such; they may be esterified or they may be converted to the corresponding metal salts. It is also within the scope of this invention to employ mixed esters of the dibasic esters, such as methyl decyl maleate, ethyl octyl maleate, etc. In the case of mixed esters the average side chain is used in determining the copolymerization activity.

In the preferred embodiment of the invention, saturated primary alcohols are employed in the preparation of these ester monomers. However, saturated secondary alcohols may be used. The alcohols used in the ester preparation may be straight chain or branched chain alcohols. Suitable relatively long chain alcohols are commercially available products derived from cocoanut oil and other natural sources, and those produced by the Oxo reaction between carbon monoxide, hydrogen and olefins such as polymers and copolymers of ethylene, propylene, butenes, etc. Mixtures of alcohols of relatively pure alcohols may be employed, for example decyl, dodecyl, tetradecyl, cetyl, stearyl, 2-ethylhexyl, 3,5,5-trimethylhexyl, etc.

It is necessary that a sufficient number of long side chains, i. e., a side chain containing 8 carbon atoms or more, be present in the copolymer product to insure oil-solubility. These long chains are obtained by employing alph-beta unsaturated monocarboxy acid esters of long chain alcohols in the copolymerization reaction. It should be pointed out, however, that the long chain alpha-beta unsaturated monocarboxy acid ester may constitute all or only a portion of the total alpha-beta unsaturated monocarboxy acid ester employed. In the preparation of these improved copolymers a ratio of alpha-beta unsaturated monocarboxy acid ester esters to alpha-beta unsaturated dicarboxy acid esters is selected so that the resulting copolymer has an average side chain greater than about $C_4$ and less than about $C_{15}$. It should be noted that the most potent V. I. improvers have the smallest average side chains; however, they exhibit the greatest tendency toward insolubility in lubricating oils. For this reason average side chains in the $C_7$–$C_{12}$ range are preferred, for example, copolymers containing 0.25/1.0 mol dimethyl maleate/decyl methacrylate, 0.1/1.0 to 0.6/1.0 diethyl fumarate/Lorol B methacrylate, 0.2/1 to 1/1 di $C_7$ oxo fumarate/stearyl acrylate, etc. It should also be noted that best potency as regards pour point reduction in a wide variety of different oils is obtained when the copolymer contains side chains in the $C_8$–$C_{18}$ range, said side chains averaging about $C_{11}$–$C_{14}$. The average molecular weight of the copolymers should be in range from about 1,000 to about 30,000 to ensure activity and complete oil solubility. In the case of V. I. improvers molecular weights above 5,000, for example 10,000–20,000 are preferred. When pour depressant activity alone is desired copolymers as low as 1000 in molecular weight may be employed. The molecular weight is easily controlled by means well known to the art, for example by reaction variables such as temperature, catalyst and monomer concentration during copolymerization.

The conditions for the copolymerization of the esters may involve either the bulk or emulsion technique. In bulk copolymerization, which is preferred, diluents such as hydrocarbons, for example, toluene, naphtha, oil, esters, ethers, halides, and the like, may be used. A high quality lubricating oil of the SAE 10 to 30 range is especially preferred as the diluent, since this need not be removed after the copolymerization, a concentrate of the copolymer which is easily blended with other oils being obtained directly. Such concentrates may contain from 20 to 60% of copolymer, for example. Peroxides such as benzoyl peroxide, lauroyl peroxide, t-butyl hydroperoxide, cumene hydroperoxide and the like, either alone or in combination with reducing activators in a redox system may be used in concentrations of from 0.25 to 5.0 wt. percent (based on the monomers) as catalysts for the copolymerization. Other systems of copolymerization which may be used are activated clays, ultra violet light, and the like.

The copolymers of the invention are employed in lubricating oils in concentrations of from 0.01 to 0.25% when pour point depression is the primary object, and from 0.25 to 10% or higher when V. I. improvement is desired.

The invention may be further explained by referring to the following examples:

EXAMPLE I 2.0 grams of diethyl fumarate, 11.0 grams of octyl, decyl methacrylate prepared from a mixture of normal octyl and decyl alcohols having a carbon chain length of from 8.5 to 9.0 carbon atoms, and 10 grams of a white mineral oil having a viscosity at 210° F. of 43 S. U. S. were mixed in a small glass tube. To this solution was added 0.13 gram of 100 mesh benzoyl peroxide and the glass tube was flushed with nitrogen and stoppered tightly. Complete solution was effected by shaking and the tube was placed in an oil bath at 70° C. for 48 hours. A heavy clear homogeneous copolymer was obtained which when blended to 20 weight percent of copolymer in a lubricating oil having a viscosity of 210° F. of 44 S. U. S. has a viscosity at 210° F. of 332.6 S. U. S. This oil blend was used directly as a viscosity index improver.

EXAMPLE II

A copolymer was prepared in exactly the same manner as Example I except that 2.0 grams of diethyl maleate were used in the place of diethyl fumarate employed in Example I. Again a heavy clear homogeneous copolymer was obtained. This material was blended to 20 weight percent of copolymer in a lubricating oil having a viscosity at 210° F. of 44 S. U. S. and gave a blend having a viscosity at 210° F. of 340.6 S. U. S. This oil blend of the copolymer was used directly as a viscosity index improver.

The oil blend of the copolymer of Examples I and II was blended with a lubricating oil base having a viscosity at 210° F. of 45 S. U. S. and a viscosity index of 115. These oil blends were compared with comparable oil blends of a straight octyl, decyl methacrylate copolymer and with two commercial V. I. improvers. Results of this comparison test are shown in the following table:

Table I
V. I. IMPROVING POWER OF COPOLYMERS
[3.6 weight per cent blends of copolymers and commercial V. I. improvers in a base oil having 115 V. I. 45 S. U. S. viscosity at 210° F.]

|  | Ex. I | Ex. II | Octyl, decyl Methacrylate Copolymer | Commercial V. I. Improver X | Commercial V. I. Improver Y |
| --- | --- | --- | --- | --- | --- |
| Viscosity of 20% Blend of copolymer in Oil A [1] | 332.6 | 340.6 | 566.4 | 651 | 336 |
| 3.6% Blends: |  |  |  |  |  |
| Vis./100° F | 285.7 | 290.3 | 346 | --- | --- |
| Vis./210° F | 63.5 | 63.5 | 71.7 | 71.0 | 66.5 |
| V. I. | 147.2 | 145.9 | 146.9 | 147.2 | 144.2 |

[1] Oil A = solvent extracted lubricating oil having 43–44 S. U. S. viscosity at 210° F., 112 V. I.

It will be noted from the above table, that while the viscosity index improving power of the copolymer of Examples I and II are essentially the same as the straight octyl, decyl methacrylate copolymer and the commercial viscosity index improvers, the copolymers of this invention have a much lower thickening power as demonstrated by the viscosities of the blends at 210° F. This is a decided advantage in lubricating oil additives especially when it is desired to improve the viscosity index of a low viscosity oil.

It has been mentioned above that the polymers of this invention have superior shear stability characteristics. This is graphically shown by the following example:

EXAMPLE III 10 grams of diethyl fumarate, 150 grams of a white oil having a viscosity at 210° F. of 43 S. U. S. and 90 grams of octyl, decyl methacrylate prepared from an octyl, decyl alcohol having a chain length of from 8.5 to 9.0 carbon atoms were charged to a 500 cc. glass flask equipped with a stirrer, a thermometer and a nitrogen purge line. 0.25 gram of 100 mesh benzoyl peroxide was added and the reaction mixture heated to 70° C. 0.50 gram of benzoyl peroxide was added during the next 24 hours. The total heating time was 45 hours, during which time a viscous copolymer slowly formed. At the end of the heating period, the copolymer-white oil concentrate was filtered and employed directly as a viscosity index improver.

In the following table, the copolymer of Example III was compared with an octyl, decyl methacrylate polymer prepared from an octyl, decyl methacrylate similar to that used in Example III. It will be noted that the copolymer of Example III gives the equivalent viscosity index improving potency at a lower thickening level and has considerably better shear stability.

Table II

| V. I. Improver | 3.6% Polymer Blends in Oil A [1] | | | | Polymer Breakdown Test [2] | |
|---|---|---|---|---|---|---|
| | Vis./15° F. | Vis./100° F. | Vis./210° F. | V. I. | Loss in V. I. | Per Cent Loss Vis./210° F. Based on Polymer |
| Example III. Octyl, Decyl Methacrylate Polymer | 5159 | 321 | 66.8 | 145 | 3.3 | 21 |
| | 6341 | 389 | 76.6 | 145 | 4.6 | 29 |

[1] Oil A = lubricating oil having 46 S. U. S. viscosity at 210° F. and 113 V. I.
[2] Circulating a 77 S. U. S./210° F. blend of V. I. improver in oil B (lubricating oil having 57.2 S. U. S. viscosity at 210° F. and 92 V. I.) through a McIntyre gear pump for one hour at 200° F. and 1000 p. s. i. g. pressure.

EXAMPLE IV

A series of copolymerization experiments was carried out using as one of the monomers an unsaturated dicarboxy acid ester of mixed relatively long chain alcohols, and as the other monomer an unsaturated monocarboxy acid ester of a short chain alcohol. The experiments were carried out at 80° C. for 16 hours using n-heptane as an inert diluent and as catalyst, 1.0 weight per cent of benzoyl peroxide based on the total monomers present. One of the monomers employed was the fumarate of Lorol, which is a commercial mixture of straight chain primary alcohols prepared from cocoanut oil, having an average chain length of about 12.8 and the approximate composition 4% $C_{10}$, 55.5% $C_{12}$, 22.5% $C_{14}$, 14% $C_{16}$ and 4% $C_{18}$. The second monomer was methyl acrylate or methyl methacrylate. The following Table III shows the proportions employed and the results obtained.

Table III

| Experiment No. | Monomers, Grams | | | Diluent, cc. n-Heptane | Polymer Product |
|---|---|---|---|---|---|
| | Lorol Fumarate | Methyl Acrylate | Methyl Methacrylate | | |
| 1 | 10 | 0 | 0 | 0 | Oil Sol. 2,000 mol. wt. |
| 2 | 7.5 | 7.5 | 0 | 15 | Insol. in oil. |
| 3 | 7.5 | 0 | 7.5 | 15 | Do. |
| 4 | 10 | 0 | 2.1 | 3.5 | Insol. White precip. |
| 5 | 10 | 0 | 2.1 | 9.2 | Do. |
| 6 | 10 | 0 | 2.1 | 20.8 | Do. |
| 7 | 10 | 0 | 2.1 | 55.3 | Do. |

It can be seen from the data in Table III that whereas Lorol fumarate alone polymerized to give an oil-soluble product, the addition of an equal weight of methyl acrylate or of methyl methacrylate gave oil-insoluble products. The data show further that decreasing the proportion of methyl methacrylate considerably and employing approximately equal mols of fumarate and methacrylate in experiments 4–7 did not give oil-soluble products. The data also show that no improvement in solubility resulted when the reactant monomers were greatly diluted. It is evident that little or no copolymerization resulted between the long chain dicarboxy acid ester and the short chain monocarboxy acid ester.

EXAMPLE V

A 0–60 volume per cent fraction of Lorol, obtained by vacuum fractionation and consisting of about 93% dodecanol and 7% decanol, was used to prepare the ester of acrylic acid, and also the mixed methyl Lorol ester of fumaric acid. The two esters were polymerized singly and as an equi-molar mixture at 80° C. using benzoyl peroxide as the catalyst. The resulting polymers were tested for pour point depressing potency in two solvent extracted Mid-Continent oils of the SAE–10 grade, with the results shown in Table IV:

Table IV

| Polymer | Average Side Chains, C's | ASTM Pour Points, °F. | | |
|---|---|---|---|---|
| | | Oil A = +5° F. | | Oil B = +20° F. |
| | | 0.2% | 2.4% | 0.2% |
| 0–60 Lorol Acrylate | 11.9 | −20 | +5 | −15 |
| Methyl 0–60 Lorol Fumarate | 6.5 | −25 | (¹) | −20 |
| Acrylate-Fumarate Copolymer | 9.2 | <−35 | −25 | −30 |

¹ Not determined.

The data in Table IV show that the copolymer had better pour depressant activity than that of either polymer.

EXAMPLE VI

Equal volumes of di-ethyl fumarate and the methacrylate of Lorol were copolymerized at 80° C. in the presence of 1.0 weight percent of benzoyl peroxide catalyst. The product was insoluble in lubricating oil.

The experiment was repeated employing an equal volume of n-heptane as diluent, this being later removed by evaporation. In this case the copolymer was soluble in oil. It had a molecular weight of 5800 (Staudinger, in di-isobutylene). The copolymer alone was not exceptional as a pour point depressant. However, its presence in an oil enhanced the potency of a well-known commercial pour depressant. In addition, the copolymer was a very good viscosity index improver despite its relatively low molecular weight, as shown by the data in Table V:

Table V

| | Viscosity, Saybolt Sec. | | | Vis. Index | ASTM Pour, ° F. |
|---|---|---|---|---|---|
| | 15° F. | 100° F. | 210° F. | | |
| Solvent Refined Mid-Continent Oil | | | | | +5 |
| +0.3% of Commercial Pour Depressant | 2780 | 156.9 | 44.5 | 114 | −15 |
| Ditto +1.2% of Ethyl Fumarate-Lorol Methacrylate Copolymer | 2940 | 172.2 | 46.6 | 125 | −35 |

To summarize briefly, this invention is concerned with valuable lubricating oil additives which are prepared by copolymerizing alpha-beta unsaturated monocarboxy acid esters with alpha-beta unsaturated dicarboxy acid esters. An important feature of the invention is the regulation of the copolymerization activity of the monomer pairs so that oil-soluble homogeneous copolymers result. This regulation of copolymerization activity is done by increasing the molecular weight of the alpha-beta unsaturated monocarboxy acid esters so that it approaches the copolymerization activity of an alpha-beta unsaturated dicarboxy acid ester having a carbon chain length below 8 carbon atoms contributed by the alcohol portion. It is to be understood, of course, that the concept of the invention is not limited to the examples given which are included merely for purposes of illustration.

The copolymers of this invention can be employed in lubricating oil compositions which also contain other additives, for example, oxidation inhibitors, sludge dispersers, detergents, bearing corrosion inhibitors, oiliness agents, dyes, etc., as well as other pour point depressants and viscosity index improvers.

What is claimed is:

1. A lubricating oil composition consisting essentially of a lubricating oil base stock and containing from 0.01 to 15% by weight of a copolymer formed by copolymerizing an alpha-beta unsaturated monocarboxy ester having the general formula.

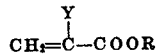

wherein R is an alkyl group, and Y is selected from the class consisting of hydrogen and methyl groups with an alpha-beta unsaturated dicarboxy ester having the general formula

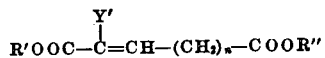

wherein R' and R'' are alkyl groups having an average of not more than 8 carbon atoms, Y' is selected from the class consisting of hydrogen and methyl groups, and $n$ is an integer from 0 to 1, the average number of carbon atoms of R' and R'' subtracted from the number of carbon atoms of R being a number between 5 and 20, the esters being copolymerized in proportions such that the resulting copolymer has an average side chain greater than about $C_4$ and less than $C_{15}$.

2. A lubricating oil composition according to claim 1 wherein; R' and R'' are alkyl groups having an average of not more than 8 carbon atoms, the difference between R and the average of R' and R'' is between 5 and 20 carbon atoms, and $n$ is zero.

3. A lubricating oil composition according to claim 1 wherein; R' and R'' are alkyl groups having an average of not more than 8 carbon atoms, the difference between R and the average of R' and R'' is between 5 and 20 carbon atoms, $n$ is zero, and Y' is hydrogen.

4. A lubricating oil composition according to claim 1 wherein; R' and R'' are alkyl groups having an average of not more than 8 carbon atoms, the difference between R and the average of R' and R'' is between 5 and 20 carbon atoms, $n$ is zero, Y' is hydrogen, and Y is a methyl group.

5. A lubricating oil composition consisting essentially of a lubricating oil base stock having dissolved therein from 0.01 to 15.0% by weight of an oil soluble homogeneous copolymer formed by copolymerizing about one part by weight of diethyl fumerate with about nine parts by weight of octyl, decyl methacrylate in the presence of a benzoyl peroxide catalyst, said octyl, decyl methacrylate having been formed from an octyl and decyl alcohol mixture having an average chain length of from 8.5 to 9 carbon atoms.

THOMAS STANFORD TUTWILER.
JOHN C. MUNDAY.
DILWORTH T. ROGERS.

REFERENCES CITED

The following references are of record in the file of this patent:

UNITED STATES PATENTS

| Number | Name | Date |
|---|---|---|
| 2,200,429 | Perrin | May 14, 1940 |
| 2,365,717 | Mighton | Dec. 26, 1944 |
| 2,380,304 | Gleason | July 10, 1945 |